F. ASHLEY.
Meat Chopper.
No. 54,274.    Patented May 1, 1866.
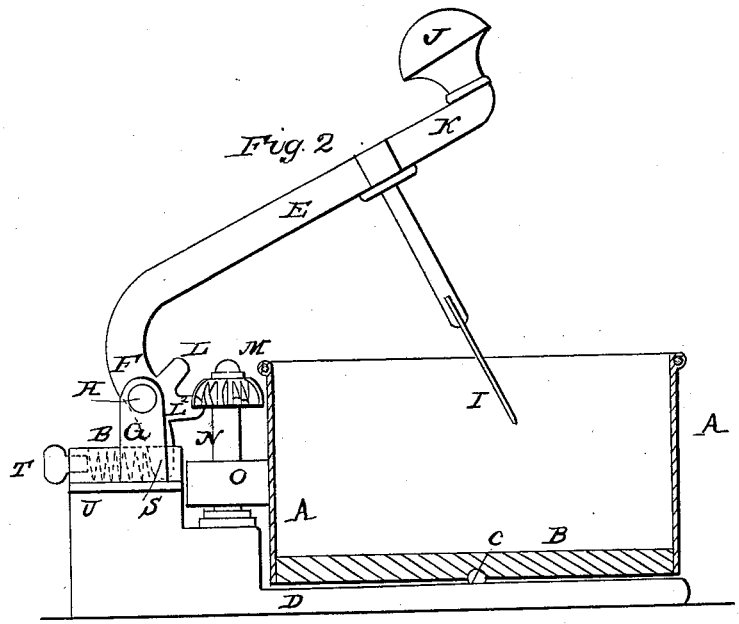
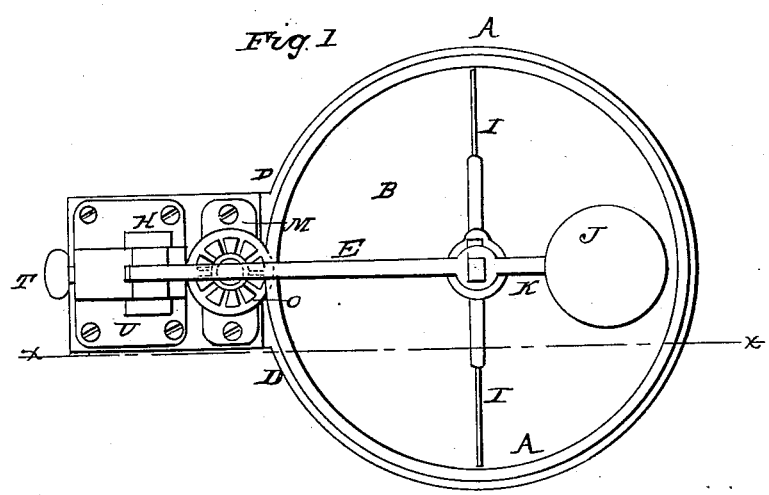
Witnesses
J. W. Boningtson
Inventor
Fred'k Ashley
Per Munn & Co.
Att'ys

UNITED STATES PATENT OFFICE.

FREDERICK ASHLEY, OF NEW YORK, N. Y.

IMPROVED MEAT-CHOPPER.

Specification forming part of Letters Patent No. 54,274, dated May 1, 1866.

*To all whom it may concern:*

Be it known that I, FREDERICK ASHLEY, of the city, county, and State of New York, have invented a new and useful Improvement in Choppers for Meat and other Articles; and I do hereby declare that the following is a full, clear, and exact description thereof, which will enable others skilled in the art to make and use the same, reference being had to the accompanying drawings, forming part of this specification.

The present invention consists in arranging the vessel or receptacle in which the meat or other article or articles to be chopped are placed in such manner that it can freely revolve, and in so connecting the beam having the chopping-knife secured to its outer end and hung at its other end so as to swing up and down in a vertical plane to the said meat-receptacle that as the knife-beam is moving up and down, or both, the said receptacle will be partially turned around, and thereby cause all portions of the meat or other article contained in it to be subjected to the action of the chopper or knife as it is from time to time depressed or brought down upon the same, as will be obvious from the following detail description thereof, reference being had to the accompanying plate of drawings, in which—

Figure 1 is a plan or top view of the meat-chopper, and Fig. 2, a vertical section, taken in the plane of the line $x$ $x$, Fig. 1.

A in the drawings represents the receptacle or other vessel containing the meat or other article which is to be chopped or cut up, having its bottom B made of wood or other suitable material which will not injure or dull the chopping-knife when brought in contact therewith. This vessel is placed, by its center, upon a rounded center-pin, C, of a bed piece or plate, D, upon which it can freely turn.

E is a beam or lever-arm hung at or near its bent end F, upon a fulcrum-pin, H, of a post or upright, G, of the bed-piece D of the chopper, so as to swing up and down in a vertical plane. This beam extends over the meat-receptacle, and has secured to its under side a knife or chopper-blade, I, in proper position, that, as the beam is depressed by bearing down upon or striking the knob J at its outer end, K, it will act upon the meat or other article contained in the receptacle or box A.

On the beam E, at or near its fulcrum, are formed two short arms, L L$^2$, projecting toward the meat-box A, at an acute angle to each, and one above the other, the lower arm, L$^2$, of which, when the chopper-beam is at its highest point, is engaged with the teeth of a horizontal ratchet-wheel, M, upon the upper end of a short vertical shaft, N, turning at its lower end in a suitable bearing or socket of the bed-piece D.

O is a rubber roller secured to shaft N, which roller is of suitable size to come in close contact with the periphery of the sides of the meat-box, so that if it is revolved by revolving the shaft to which it is secured the said meat-box will be also revolved in conjunction therewith.

When the chopper-beam is depressed the upper arm, L, of its two arms, L L$^2$, is engaged with the teeth of the ratchet-wheel M, the teeth being made of such form that as the chopper-beam rises (to accomplish which I use a spiral spring, R, hung at one end to the end S of the said beam, and at its other so connected to a set or thumb screw, T, of the bed-piece block U that its tension can be regulated at pleasure and made greater or less by screwing the said set-screw in or out) and lowers, the said arms L of the beam, as they pass by the same, will cause the ratchet to be revolved, and thus through its shaft N, with the rubber roller O secured to it, the meat-box A, as is obvious, whereby all portions of the meat or other article contained in the said box can be brought in proper position for being acted upon by the chopping-knife by continuing the up-and-down movement of the said beam, to which the knife is secured, as explained.

In lieu of using the ratchet-wheel and its connecting parts with the meat-box, they may be dispensed with, and the meat-box brought into direct connection with the chopper-beam by forming a suitable-shaped toothed ratchet entirely around it, it being plain to be seen that the same result would be produced as that hereinabove described, with the ratchet-wheel and connecting-roller O.

In lieu of making the roller O of rubber it may be made of leather, wood, or other suitable material which will produce a friction upon the side of the meat-box sufficient to turn it as the roller is revolved through the action of the chopper-beam; or the roller may be toothed and interlocked with the teeth of a suitable toothed rim around the meat-box.

What I claim as new, and desire to secure by Letters Patent, is—

1. In combination with a suitable box or receptacle for the meat or other article to be chopped or cut, the swinging chopper or knife beam E, having arms L L², when so arranged and connected together that by the up-and-down movement of the said beam the said meat-box will be rotated, substantially as described, and for the purpose specified.

2. The use of a spiral or other suitable spring connected with the chopper-beam, as and for the purpose specified.

The above specification of my invention signed by me this 2d day of March, 1866.

FREDK. ASHLEY.

Witnesses:
M. M. LIVINGSTON,
ALBERT W. BROWN.